(12) United States Patent
Carroll, Jr.

(10) Patent No.: US 6,860,703 B2
(45) Date of Patent: Mar. 1, 2005

(54) VEHICLE BOOM ASSEMBLY AND METHOD

(76) Inventor: Elmer C. Carroll, Jr., 10047 Inwood, Houston, TX (US) 77042

(*) Notice: Subject to any disclaimer, the term of this patent is extended or adjusted under 35 U.S.C. 154(b) by 110 days.

(21) Appl. No.: 10/091,812

(22) Filed: Mar. 6, 2002

(65) Prior Publication Data

US 2003/0170104 A1 Sep. 11, 2003

(51) Int. Cl.[7] .............................................. B66C 23/36
(52) U.S. Cl. ........................ 414/543; 212/223; 212/245; 414/917
(58) Field of Search ................................ 414/543, 917; 212/245–249, 223

(56) References Cited

U.S. PATENT DOCUMENTS

| | | | | |
|---|---|---|---|---|
| 1,338,726 A | * | 5/1920 | Goudie ........................ | 212/256 |
| 4,435,118 A | * | 3/1984 | Behrend et al. ......... | 414/744.5 |
| 4,639,182 A | * | 1/1987 | Inaba et al. .................. | 414/543 |
| 5,156,517 A | * | 10/1992 | Boissonneault ............. | 414/467 |
| 6,425,727 B1 | * | 7/2002 | Hood ......................... | 414/543 |

* cited by examiner

*Primary Examiner*—Thomas J Brahan
(74) *Attorney, Agent, or Firm*—The Matthews Firm

(57) ABSTRACT

An assembly and method is disclosed for moving a load into and out of an enclosure such as the enclosure of a van. The assembly may include an upright shaft rotatably mounted within a side portion of the enclosure. A boom assembly extends from the shaft. The boom assembly includes a beam to which an arm is pivotally mounted. An extension member is also pivotally attached to the arm such that as the shaft rotates the angular orientation of the arm with respect to the beam is controlled by the extension member whereby the load may be moved in a substantially straight direction into or out of the enclosure in response to rotation of the shaft. A length of the extension member may be adjusted to move the line of movement of the load closer or nearer to the shaft. A motorized winch is preferably mounted to the end of the arm to lift the load.

11 Claims, 3 Drawing Sheets

VEHICLE BOOM ASSEMBLY AND METHOD

TECHNICAL FIELD

The present invention relates generally to booms for lifting and, more particularly, to a conveniently mounted rotatable boom that is especially suitable for use in vehicles having enclosures to move items along a straight line into or out of the enclosure.

BACKGROUND ART

Movement of heavy items into and out of the rear end of an enclosed van or truck may be quite difficult and even hazardous for an operator due to the limited space of the enclosure wherein the operator may be placed in an awkward position while handling the heavy items.

Rotatable booms mounted in open bed pick-up vehicles are well known. The use of a rotatable boom enables an operator to easily lift and remove heavy items from an open pickup bed along a circular path. However, the use of a rotatable boom for a vehicle having an enclosed rear would not provide the ability to lift of the item along a straight path, as is often necessary due to the limited space. Therefore, moveable liftgates or tailgates and the like may typically be employed for lifting heavy items into an enclosed truck bed of the van. However, moveable liftgates or tailgates still require that the operator move heavy items to and from the rear or side entrance of the enclosed truck bed where they may be preferably located.

It would be highly desirable to have the convenience of a rotatable boom that can be conveniently mounted to one side of the enclosed bed but is still operable for lifting items along a straight line or semi-straight line to the desired position. Consequently, there remains a need for an improved rotatable boom to operate within enclosures such as those found in enclosed trucks and vans. Those skilled in the art have long sought and will appreciate the present invention which addresses these and other problems.

SUMMARY OF THE INVENTION

The present invention was designed to provide more efficient loading of an enclosed vehicle such as a van.

Therefore, it is an objective of the present invention to provide an improved assembly for loading and unloading a van.

Another objective of the present invention is to provide a loading assembly that moves the load along a substantially straight path into and out of the enclosure.

These and other objectives, as well as features, and advantages of the present invention will become apparent from the drawings, the descriptions given herein, and the appended claims. However, it will be understood that the above-listed objectives and/or advantages of the invention are intended only as an aid in quickly understanding aspects of the invention, are not intended to limit the invention in any way, and therefore do not form a comprehensive or restrictive list of objectives, and/or features, and/or advantages.

Accordingly, the invention comprises, in one embodiment thereof, an assembly mounted within an enclosure for moving a load with respect to the enclosure. The assembly may comprise one or more elements such as, for instance, a shaft mounted within the moveable enclosure so as to be rotatable with respect to the enclosure, a beam mounted to the shaft and extending outwardly from the shaft, a first pivotal connection for the beam at a beam end portion of the beam distal the shaft, an arm secured to the first pivotal connection such that the arm is pivotal with respect to the beam, an extension member mounted with respect to the beam, a second pivotal connection for the extension member at an end portion of extension member, and a winch secured with respect to the arm for lifting the load.

The assembly may further comprise an upper pivot connection for pivotally connecting an upper end of the shaft to an upper side of the enclosure and/or a lower pivot connection for connecting a lower end of the shaft to a lower side of the enclosure.

Other elements may further comprise a length adjustment operable for controlling a length of the extension member wherein the length adjustment is manually adjustable but could be motorized. The winch is preferably carried by an end portion of the arm. The assembly may further comprise a support bracket mounted to the shaft and the beam.

In other words, the assembly may comprise a shaft rotatable with respect to the enclosure, a beam mounted to the shaft and extending outwardly from the shaft, an arm pivotally secured with respect to the beam, an extension member adjacent the beam, the extension member being pivotally secured to the arm, and a winch carried by the arm for lifting the load whereby the winch is moveable closer to and further away from the shaft as desired to move the load in a substantially straight line.

The assembly may further comprise a length adjustment operable for controlling a length of the beam and/or the arm and/or the extension member.

In operation, a method is provided for moving a load into an enclosed vehicle may comprise one or more steps such as, for instance, supporting a cable or nylon strap with the arm, lifting the load with the cable or nylon strap, rotating the shaft connected to the arm to thereby move the load along a relatively straight path either into or out of the enclosed vehicle.

The method may further comprise pivotally connecting the arm to a beam and/or varying an angle between the arm and the beam while rotating the shaft.

Other steps may comprise pivotally connecting the extension member to the arm and/or utilizing the extension member to vary the angle between the arm and the beam while rotating the shaft. The method of claim may further comprise controlling a distance between the substantially straight path and the shaft by adjusting a length of the extension member and/or a length of the beam and/or a length of the arm.

This summary is not intended to be a limitation with respect to the features of the invention as claimed. These and other objects, features, and advantages of the present invention can be readily observed and understood after review of a preferred embodiment thereof as described in this specification.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

While the present invention will be described in connection with presently preferred embodiments, it will be understood that it is not intended to limit the invention to those embodiments. On the contrary, it is intended to cover all alternatives, modifications, and equivalents included within the spirit of the invention.

GENERAL DESCRIPTION OF PREFERRED MODES FOR CARRYING OUT THE INVENTION

Figure 1:
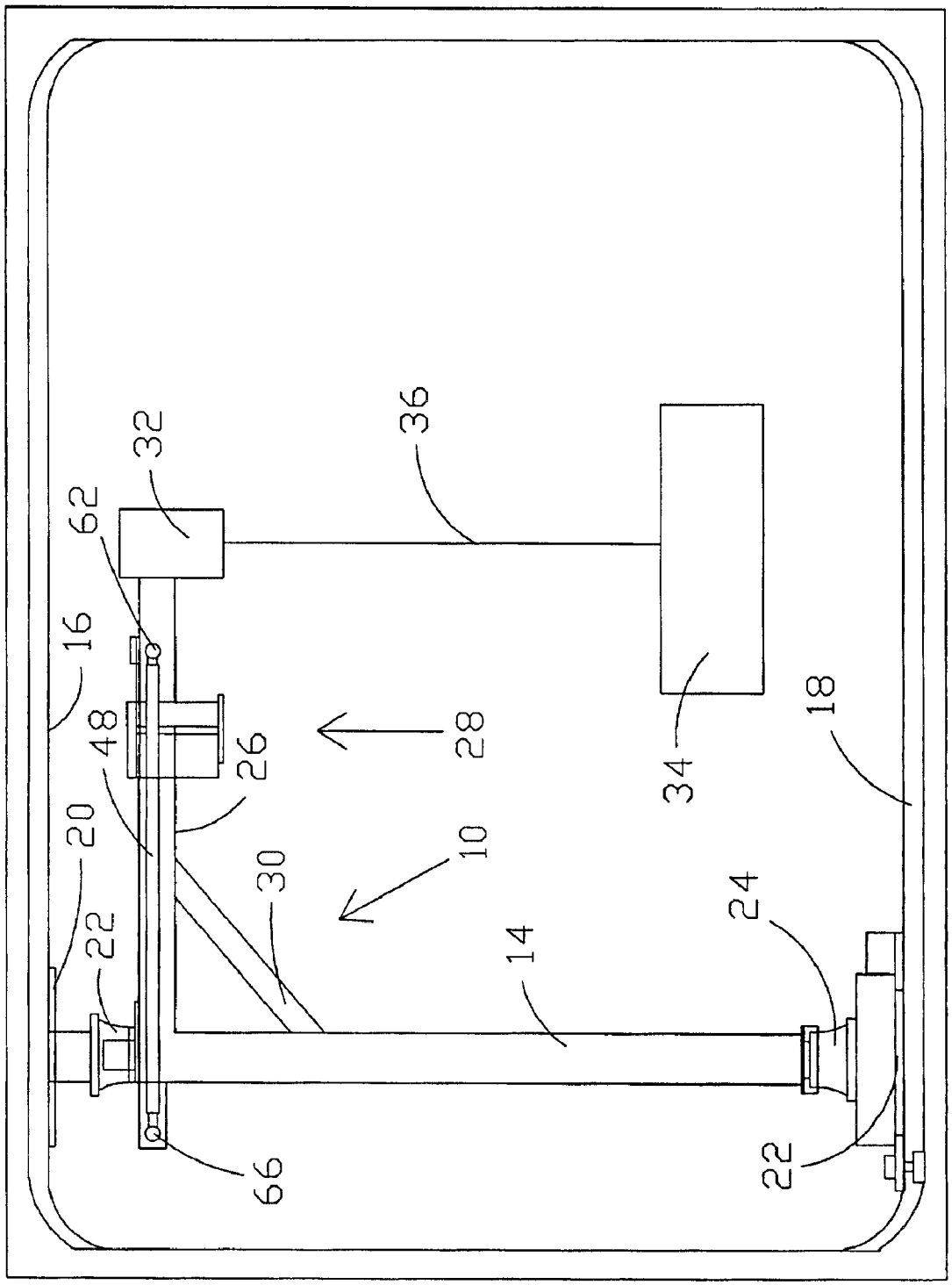
FIG. 1 is an elevational view, showing a rotatable boom mounted within an enclosed end of a van in accord with one embodiment of the invention.
Figure 2:
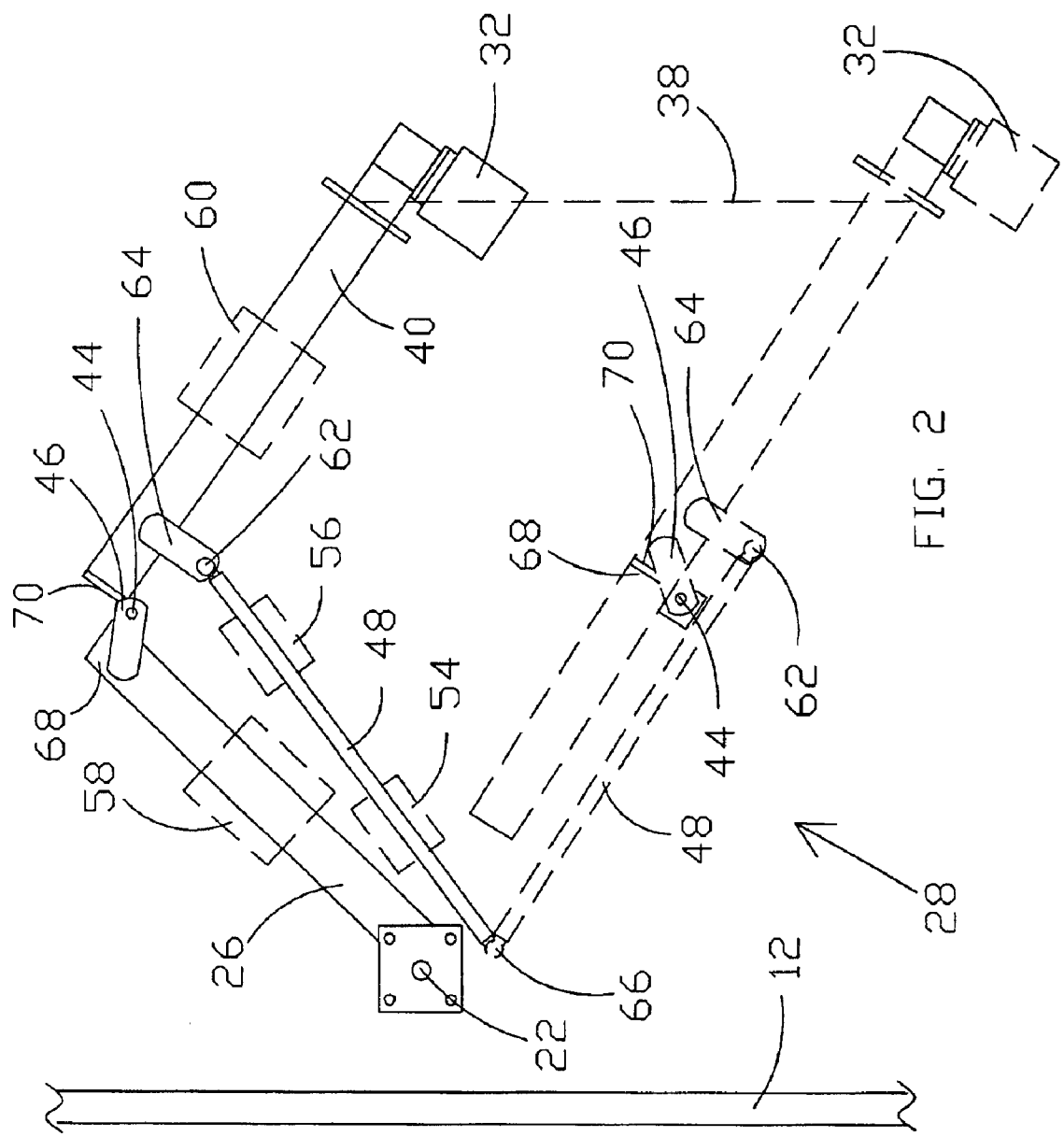
FIG. 2 is a plan view, partially in dashed lines, showing a rotatable boom arm operable to move a load along a substantially straight path within the enclosed end of a van in accord with one embodiment of the invention.

Referring now to the drawings and more particularly to FIG. 1 and FIG. 2, there are shown the relevant components of a preferred embodiment of rotatable boom 10 which may be mounted within enclosure 12. Enclosure 12 may be within a vehicle such as a van, or any other suitable enclosure, which may or may not be within a transport, plane, vehicle, ship, container, or the like. Rotatable boom 10 may also be used outside of an enclosure, such as with a flat bed truck or open bed pickup truck, but a particularly advantageous usage of boom 10 comprises operation within enclosure 12. Rotatable boom 10 includes rotatably mounted shaft 14 positioned upright within enclosure 12.

Preferably upright shaft 14 is rotatably mounted to enclosure ceiling 16 and enclosure floor 18. In a preferred embodiment, suitably sized upper mounting plate 20 and lower mounting plate 22 may be utilized to distribute the lifting forces over a wider area and to thereby compensate for the possibility of relatively thin walls of enclosure 12. Depending on the type and wall strength of enclosure, upper and lower mounting plates 20 and 22 may or may not be utilized as appropriate for the particular construction of enclosure 12 involved. Upper mounting plate 20 preferably supports upper pivotal or rotatable connection 22. Lower mounting plate 22 preferably supports lower pivotal or rotatable connection 24.

Moveable arm or beam 26 is mounted to and extends from rotatable upright shaft 14 to form the basic support structure of boom 28 shown in more detail in FIG. 2. In a preferred embodiment, boom 28 extends outwardly from upright rotatable shaft 14. Beam 26 may be supported by brace 30 or other suitable means. Winch 32 may be conveniently located on an end of boom 28 so as to be operable for lifting load 34 using cable or nylon strap 36. If desired, winch 32 could be moveable along boom 28 to provide a variable position for lifting.

The operation of boom 28 is most clearly shown in FIG. 2 wherein solid lines indicate a first position of boom 28 and dashed lines indicate a second position of boom 28. It will be noted that movement of winch 32 is along substantially straight line 38. Thus, boom 28 maybe utilized to lift objects into and out of a van or other enclosure 12 along a substantially straight line. The straight line movement is produced by controlling arm 40 which is pivotally connected to beam 26 in a presently preferred embodiment by pivot joint 44 and link 46. It will be understood that other types of hinges, links, or the like could be utilized to pivotally connect arm 40 to beam 26. By controlling the relative angle between arm 40 and beam 26, a load can be moved along substantially straight line 38 as upright shaft 14 (see FIG. 1) rotates. Essentially, the boom structure operates to move winch 32 inwardly/outwardly with respect to shaft 14 to control the path of movement. Other mechanical arrangements to perform this function may also be utilized.

Figure 3:
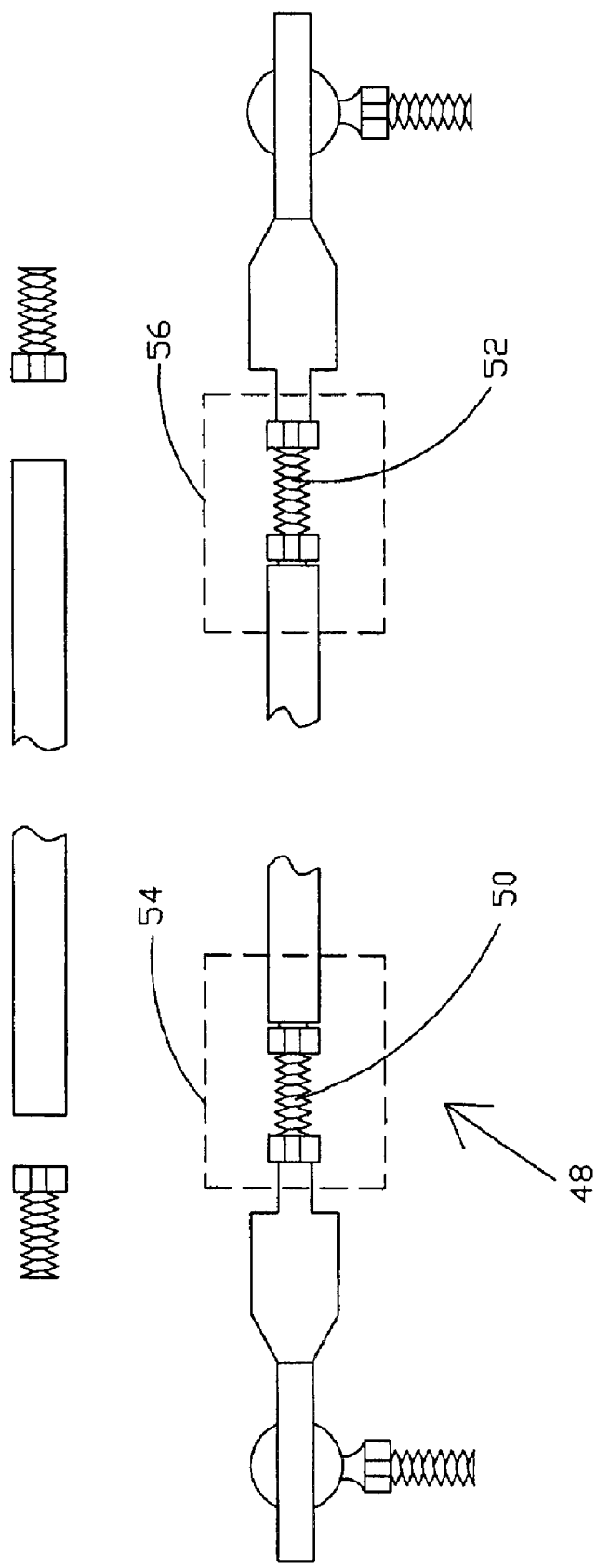
FIG. 3 is an elevational view, showing an adjustable extension rod for the rotatable boom of FIG. 1 and FIG. 2 in accord with a presently preferred embodiment of the invention.

The relative angle between arm 40 and beam 26 is controlled by extension member 48. A presently preferred extension member 48 is shown in FIG. 3. In one presently preferred embodiment, extension member 48 may utilize readily available components, such as an automobile tie rod. However, any rod may be utilized for extension member 48, including a fixed length rod, although an adjustable length extension member 48 is presently preferred. By utilizing and adjustable length extension member 48, such as that shown in FIG. 3, the relative position of the path of movement as indicated by dashed line 38 with respect to pivot 22 can be changed. Thus, if extension member 48 is shortened, then the path of movement as indicated by dashed line 38 is moved closer to pivot 22. Likewise, if extension member 48 is lengthened then dashed line 38 is moved away from pivot 22. It will be noted that there is a limit to how much extension member 48 can be lengthened or shortened when utilizing the preferred assembly as shown herein.

In the embodiment of FIG. 3, extension member 48 may be manually adjusted in length utilizing threaded adjustment and lock assemblies 50 and 52 which are well known mechanical assemblies that have in the past been utilized on automobile tie rods to effect steering. However, other length adjustment assemblies could be utilized including a motorized length adjustment assembly with one or more motorized actuators 54 and 56. Many possible assemblies such as telescoping, threaded, rack and pinion, or the like could be utilized for extending/retracting the overall length of extension assembly 48. Moreover, with use of one or more motorized extension actuators 54 or 56, if desired, the movement of a load could be controlled in any of three directions (up-down, left-right, back-front) to provide three-dimensional control. Note that a motorized or manual extension assembly, such as assemblies 58 or 60, could also be utilized for shortening or lengthening beam 26 which would also provide means for controlling the load in any of three directions as well as altering the general range of movement for load 34. Upright shaft 14 may be rotatable by motor or manually, as desired.

Extension member 48, in a presently preferred embodiment, is connected by pivot connection 62 to link 64. Link 64 is affixed to arm 40. Likewise link 46 is affixed to arm 40. Pivot connection 44 is secured to beam 26. Thus, arm 40 is pivotal with respect to beam 26 due to the pivotal connection formed by pivot 44 and link 46. The angular position of arm 40 with respect to beam 26 is controlled by the length of extension member 48 which is connected to arm 40 through pivot 62 and link 64. Extension member 48 is pivotally connected on its opposite end at pivot 66 which may be affixed in position with respect to the relative position of upright shaft 14.

In operation of one preferred embodiment of boom 28, as best illustrated in FIG. 2, when beam 26 is in the position as shown indicated by solid lines, the length of extension arm 48 constrains arm 40 to pivot with respect to beam 26 as shown. As beam 26 rotates around upright shaft 14 to the position indicated by dashed lines, arm 40 pivots to reduce the angle between beam 26 and arm 40 until, in this embodiment, arm 40 is straight with respect to beam 26. In this embodiment, a stop position is effectively provided when end beam end 68 engages arm end 70. Thus, load 34 moves along a substantially straight line as indicated by 38 as upright shaft 14 rotates to thereby move load 34 into or out of enclosure 12.

Thus beam 28 provides a mechanism to move winch 32 inwardly/outwardly with respect to upright shaft 14 to control the movement of the load along a desired path. Other mechanical assemblies, could be utilized. For instance, winch 32 could be moveable on a rail or so forth along beam 26 to control the aforesaid distance between winch 32 and shaft 14. Beam 28 could be telescoping. Although the presently preferred embodiment automatically controls the path of movement of the load along line 38, this may be left for the operator. In this case, for instance, extension member 48 could be left off. Moreover, instead of extension member 48, a motor may be used to control the angle between arm 40 and beam 26. If beam 26 were telescoping, then a motor could be used to vary the length thereof.

Thus, in any one of the manners discussed herein or in any combination thereof, enhanced lifting/moving operation of a load is achieved. It may be seen from the preceding description that a new and improved rotatable boom 10 has been provided. Although very specific combination examples have been described and disclosed, the invention of the instant application is considered to comprise and is intended to comprise any equivalent structure some variations of which have been briefly mentioned hereinbefore.

The foregoing disclosure and description of the invention is therefore illustrative and explanatory of one or more presently preferred embodiments of the invention and variations thereof, and it will be appreciated by those skilled in the art that various changes in the design, organization, order of operation, means of operation, equipment structures and location, methodology, and use of mechanical equivalents, as well as in the details of the illustrated construction or combinations of features of the various elements, maybe made without departing from the spirit of the invention. As well, the drawings are intended to describe the concepts of the invention so that the presently preferred embodiments of the invention will be plainly disclosed to one of skill in the art but are not intended to be manufacturing level drawings or renditions of final products and may include simplified conceptual views for easier and quicker understanding or explanation of the invention. As well, the relative size and arrangement of the components may be greatly different from that shown and still operate well within the spirit of the invention as described hereinbefore and in the appended claims. It will be seen that various changes and alternatives may be used that are contained within the spirit of the invention. Moreover, it will be understood that various directions such as "upper," "lower," "bottom," "top," "left," "right," "inwardly," "outwardly," and so forth are made only with respect to easier explanation in conjunction with the drawings and that the components may be oriented differently, for instance, during transportation and manufacturing as well as operation. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An assembly mounted within a moveable enclosure for moving a load with respect to said enclosure, said assembly comprising:

a shaft mounted within said moveable enclosure so as to be rotatable with respect to said enclosure;

a beam mounted to said shaft and extending outwardly from said shaft, and further comprising a length adjustment operable for controlling the length of said beam;

a first pivotal connection for said beam at a beam end portion of said beam distal said shaft;

an arm secured to said first pivotal connection such that said arm is pivotal with respect to said beam;

an extension member mounted with respect to said beam;

a first pivotal connection for said extension member at an end portion of said extension member, said arm being secured to said first pivotal connection such that said extension member controls a relative angle formed between said beam and said arm as said shaft rotates; and a winch secured with respect to said arm for lifting said load.

2. The assembly of claim 1, further comprising an upper pivot connection for pivotally connecting an upper end of said shaft to upper side of said enclosure, and a lower pivot connection for connecting a lower end of said shaft to a lower side of said enclosure.

3. The assembly of claim 1, further comprising a length adjustment operable for controlling a length of said extension member.

4. The assembly of claim 3, wherein said length adjustment is manually adjustable.

5. The assembly of claim 3, wherein said length adjustment is motorized.

6. The assembly of claim 1, wherein said winch is carried by an end portion of said arm.

7. The assembly of claim 1, further comprising a support bracket mounted to said shaft and said beam.

8. The assembly of claim 1, further comprising a length adjustment operable for controlling a length of said arm.

9. An assembly mounted within a moveable enclosure of a transport for moving a load with respect to said enclosure, said assembly comprising:

a shaft mounted within said moveable enclosure so as to be rotatable with respect to said enclosure;

a beam mounted to said shaft and extending outwardly from said shaft, and further comprising a length adustment operable for controlling the length of said beam;

an arm pivotally secured with respect to said beam;

an extension member adjacent to said beam, said extension member being pivotally secured to said arm such that said extension member constrains said arm to pivot with respect to said beam as said shaft rotates;

a boom mounted to said shaft; and a winch carried by said boom for lifting said load such that as said shaft rotates said length of said boom is variable to control a path of movement of said load.

10. The assembly of claim 9, further comprising a length adjustment operable for controlling a length of said extension member.

11. The assembly of claim 9, further comprising a length adjustment operable for controlling a length of said arm.

* * * * *